United States Patent
Kashyap et al.

(10) Patent No.: US 8,201,182 B2
(45) Date of Patent: Jun. 12, 2012

(54) METHOD OF MANAGING WORKLOADS

(75) Inventors: Vivek Kashyap, Beaverton, OR (US); Chandra S. Seetharaman, Portland, OR (US); Narasimha N. Sharoff, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 1173 days.

(21) Appl. No.: 11/963,971

(22) Filed: Dec. 24, 2007

(65) Prior Publication Data

US 2009/0164633 A1    Jun. 25, 2009

(51) Int. Cl.
*G06F 9/46* (2006.01)
*G06F 15/173* (2006.01)
(52) U.S. Cl. .................. 718/104; 709/224; 709/226
(58) Field of Classification Search .................. None
See application file for complete search history.

(56) References Cited

U.S. PATENT DOCUMENTS

| | | | | |
|---|---|---|---|---|
| 5,355,487 A * | 10/1994 | Keller et al. | ................. | 717/127 |
| 5,721,876 A * | 2/1998 | Yu et al. | ........................ | 703/27 |
| 5,761,091 A * | 6/1998 | Agrawal et al. | ............... | 702/186 |
| 2007/0234365 A1 * | 10/2007 | Savit | ........................... | 718/104 |

* cited by examiner

*Primary Examiner* — Jennifer To
*Assistant Examiner* — Abdullah Al Kawsar
(74) *Attorney, Agent, or Firm* — Yudell Isidore Ng Russell PLLC

(57) ABSTRACT

A method of managing software application workloads starts, on a machine, a software application from startup script. The startup script includes startup tasks. The machine includes an operating system. The operating system includes a kernel. The method requests an application group identifier from the kernel. The method associates the startup tasks with the application group identifier until the startup script ends. The method requests application group identifiers from the kernel. If said application group identifier is a workload, the method requests the kernel to aggregate usage data for the application group identifier. If the application group identifier is not a workload, the method determines a set of application group identifiers that comprise a work load, and requests the kernel to aggregate usage data for the set of application group identifiers. The method receives the aggregated usage data from the kernel, and uses the aggregated usage data to manage the workload.

18 Claims, 2 Drawing Sheets

METHOD OF MANAGING WORKLOADS

BACKGROUND OF THE INVENTION

1. Technical Field

The present invention relates generally to the field of computer workload management, and more particularly to a method of managing workloads by aggregating resource statistics at an application group level.

2. Description of the Related Art

Workload management software is a program that monitors and manages for his workloads running on the system. Typically, a workload is an application or a set of applications running on the system. Examples of applications include DB2™, WebSphere™, and the like. The workload management software monitors and/or manages the workloads running on the system. Monitoring may involve collecting data to determine how the application is progressing, the statistics such as real-time CPU taken, delays in processing, such as CPU delays, I/O delays, page delays, and the like. Managing involves moving system resources to enable applications to meet their required goals. Workload management software currently treats applications as individual workloads.

SUMMARY OF THE INVENTION

The present invention provides a method of managing software application workloads. The method starts, on a machine, a software application from startup script. The startup script includes startup tasks. The machine includes an operating system. The operating system includes a kernel. The method requests an application group identifier from the kernel. The method associates the startup tasks with the application group identifier until the startup script ends. The method requests application group identifiers from the kernel. If said application group identifier is a workload, the method requests the kernel to aggregate usage data for the application group identifier. If the application group identifier is not a workload, the method determines a set of application group identifiers that comprise a work load, and requests the kernel to aggregate usage data for the set of application group identifiers. The method receives the aggregated usage data from the kernel, and uses the aggregated usage data to manage the workload.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
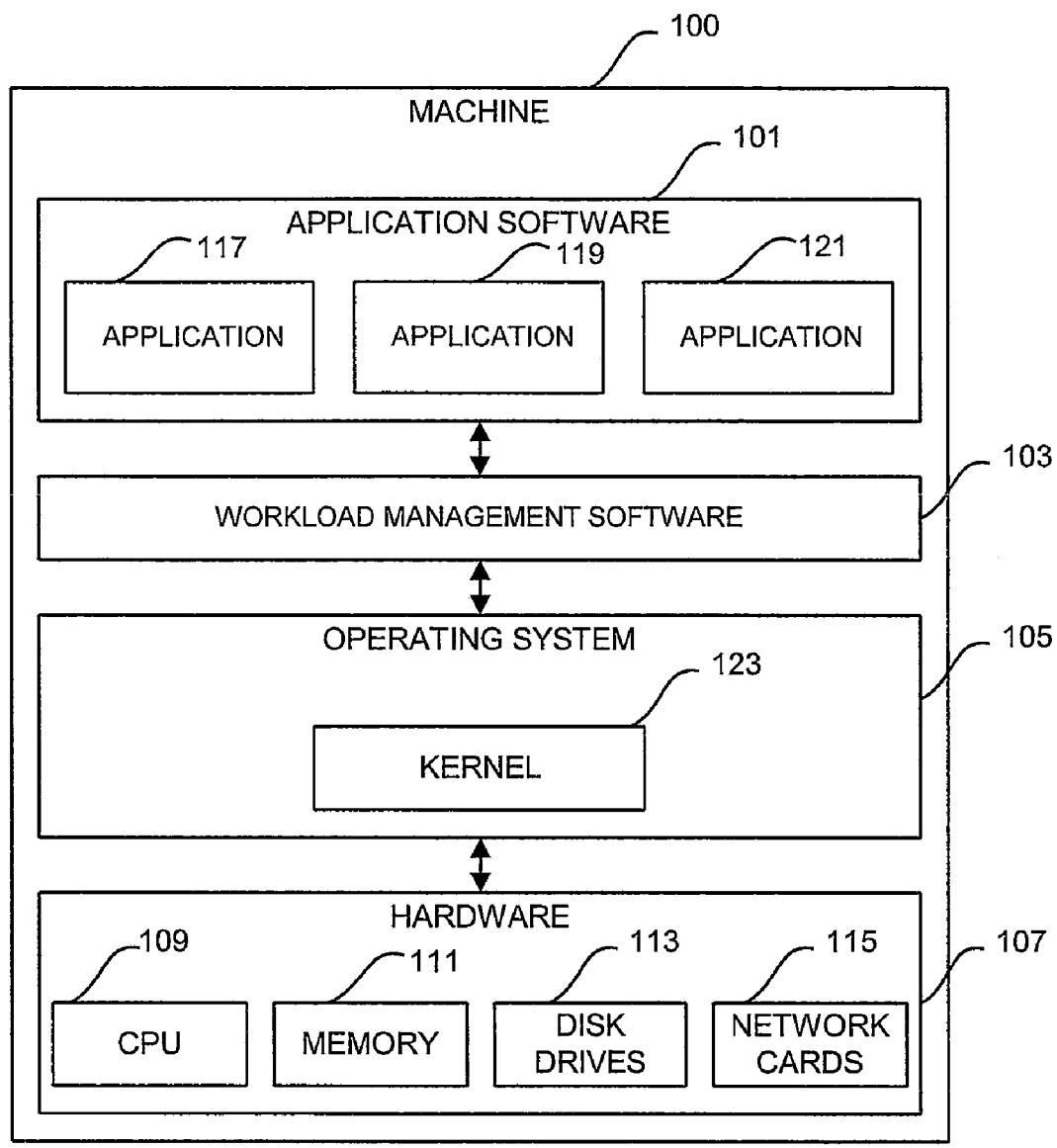
FIG. 1 is a block diagram of an embodiment of a system according to the present invention.

FIG. 1 is a block diagram of an embodiment of the present invention implemented on a machine 100. Machine 100 may be any suitable information handling system such as a personal computer, a large server, or the like. Machine 100 is illustrated as a standalone system. However, those skilled in the art will recognize that machine 100 may be implemented in a virtual machine environment or distributed across multiple platforms.

Machine 100 includes both software and hardware. The software includes application software 101, workload management software 103, and an operating system 105. Hardware 107 includes a central processing unit (CPU) 109, memory 111, disk drives 113, and network cards 115.

Application software 101 a plurality of applications, including applications 117-121. Applications 117-121 may be applications such as DB2™, WebSphere™, or the like. Workload management software 103 is middleware that sits between application software 101 and operating system 105. Workload management software 103 aggregates computing resources and schedules and distributes the work of applications 117-121 across hardware 107. Workload management software 103 also provides usage information and statistics to system managers.

Operating system 105 includes a kernel 123. Kernel 123 is a basic component of operating system 105. Kernel 123 provides the lowest level abstraction layer for resources, including hardware 107, that application software 101 uses to perform functions. Kernel 123 typically makes resources available to application processes through process communication mechanisms and system calls.

Figure 2:
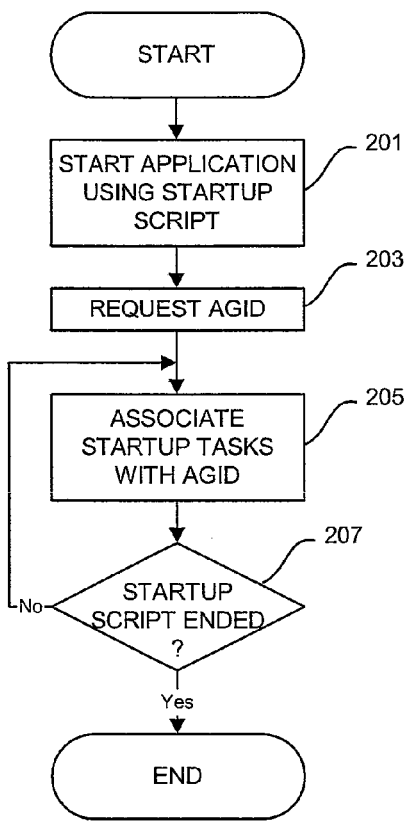
FIG. 2 is a flowchart of an embodiment of associating tasks with an application group identifier according to the present invention; and, FIG. 3 is a flow chart of an embodiment of workload data aggregation according to the present invention.

FIG. 2 is a flow chart of application group identifier (AGID) assignment according to an embodiment of the present invention. An application is started using a startup script, as indicated at block to a one. A call is made, at block 203, to indicate a new application group is starting. The kernel returns an AGID. Then, as indicated at block 205, a set of tasks that are started as part of running the script are associated to the AGID. Any processes that are forked off during the running of the script are also automatically associated with the AGID. When, as determined at decision block 207, the startup script is ended, a call is made to notify the end of the application startup script.

Figure 3:
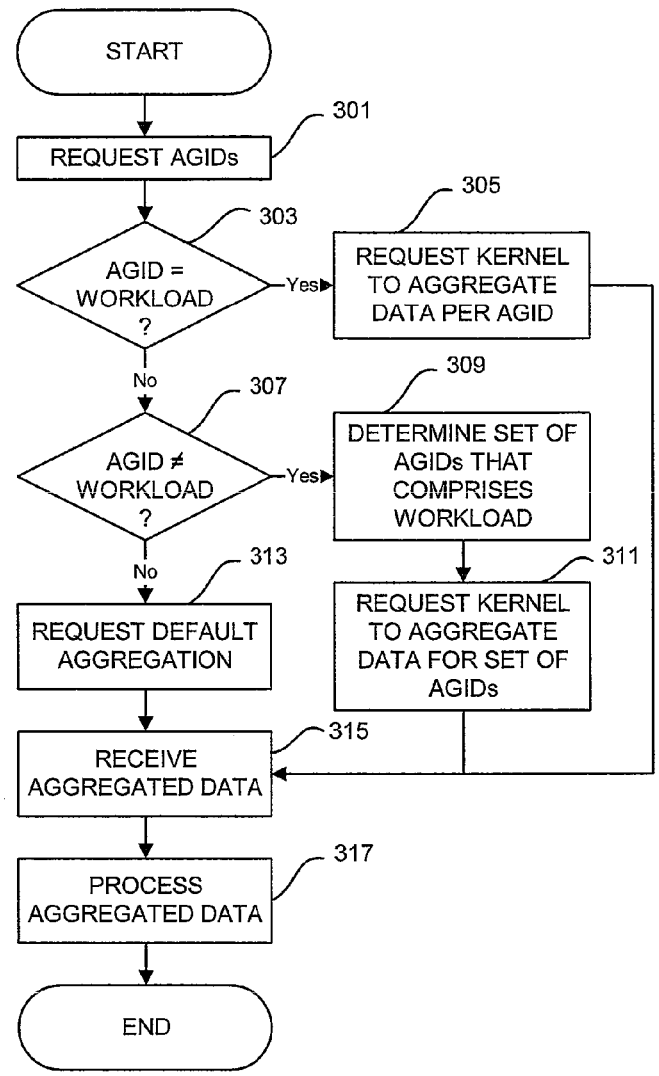

FIG. 3 is a flow chart of workload management software processing according to an embodiment of the present invention. When the workload management software starts up, it requests the kernel to provide a set of AGIDs, at block 301. The kernel returns a set of AGIDs and the tasks associated to each AGID. The workload management software, based on dynamic policy, then determines the correspondence between the AGIDs and the workloads. If, as determined at decision block 303, an AGID is equal to workload, the workload management software requests the kernel to aggregate usage or resource data on a per AGID basis, as indicated at block 305. If, as determined at decision block 307, an AGID is not equal to workload, the workload management software determines a set of AGIDs that comprises a workload, as indicated at block 309. Then, the workload management software requests the kernel to aggregate usage or resource data for the set of AGIDs, as indicated at block 311. Otherwise, the workload management software requests the kernel to provide a default aggregation, as indicated at block 313. For example, the workload management software can request data for named processes or threads. The workload management software receives the aggregated data, as indicated at block 315.

The workload management system processes the aggregated data, as indicated at block 317, to perform its management functions. For example, the workload management software may determine whether business goals for running mission-critical applications are being met. The workload management system may determine whether system resources available are sufficient to meet the business demands. The workload management system may use the data to identify bottlenecks or other performance related issues.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of managing software application workloads, the method comprising:
    starting a software application from a startup script on a machine, said startup script including a set of startup tasks, said machine including an operating system, said operating system including a kernel;
    receiving an application group identifier from said kernel;
    associating each of said startup tasks with said application group identifier until said startup script ends;
    associating the application group identifier with processes that are forked off during the running of the startup script;
    requesting application group identifiers from said kernel at startup of workload management processing;
    determining a correspondence between the application group identifiers returned from said kernel and one or more workloads;
    if said application group identifier is equal to a workload, requesting said kernel to aggregate usage data for said application group identifier;
    if said application group identifier is not equal to a workload, determining a set of application group identifiers that comprise a workload, and request said kernel to aggregate usage data for said set of application group identifiers, wherein the workload is identified by a set of application group identifiers when the application group identifier is not equal to a workload;
    receiving said aggregated usage data from said kernel; and
    processing the received aggregated usage data to manage said workload.

2. The method of claim 1, wherein processing the received aggregated usage data to manage said workload comprises processing the received aggregated usage data to determine whether business goals for running mission-critical applications are being met.

3. The method of claim 1, wherein processing the received aggregated usage data to manage said workload comprises processing the received aggregated usage data to determine whether system resources available are sufficient to meet the business demands.

4. The method of claim 1, wherein processing the received aggregated usage data to manage said workload comprises processing the received aggregated usage data to identify bottlenecks and other performance related issues.

5. The method of claim 1, further comprising providing a default aggregation wherein the workload management processing requests data for named processes or threads.

6. A method of managing software application workloads, the method comprising:
    starting a software application from startup script on a machine, said startup script including a set of startup tasks, said machine including an operating system, said operating system having a kernel;
    receiving an application group identifier from said kernel;
    associating each of said startup tasks with said application group identifier until said startup script ends;
    associating the application group identifier with processes that are forked off during the running of the startup script; and
    managing workloads on the machine using the application group identifier, wherein a workload is identified by a set of application group identifiers when the application group identifier is not equal to a workload, wherein said managing workloads includes:
        requesting application group identifiers from said kernel at startup of workload management processing;
        determining a correspondence between the application group identifiers returned from said kernel and one or more workloads; and
        if said application group identifier is equal to a workload, requesting said kernel to aggregate usage data for said application group identifier.

7. The method as claimed in claim 6, further comprising:
    receiving said aggregated usage data from said kernel; and
    processing said aggregated usage data to manage said workload, wherein processing the received aggregated usage data to manage said workload comprises at least one of processing the received aggregated usage data to determine whether business goals for running mission-critical applications are being met; processing the received aggregated usage data to determine whether system resources available are sufficient to meet the business demands; and processing the received aggregated usage data to identify bottlenecks and other performance related issues.

8. The method as claimed in claim 6, further comprising:
    if said application group identifier is not equal to a workload, determining a set of application group identifiers that comprise a workload, and requesting said kernel to aggregate usage data for said set of application group identifiers.

9. The method as claimed in claim 8, further comprising:
    receiving said aggregated usage data from said kernel; and
    processing said aggregated usage data to manage said workload.

10. The method of claim 9, wherein processing the received aggregated usage data to manage said workload comprises processing the received aggregated usage data to determine whether business goals for running mission-critical applications are being met.

11. The method of claim 9, wherein processing the received aggregated usage data to manage said workload comprises processing the received aggregated usage data to determine whether system resources available are sufficient to meet the business demands.

12. The method of claim 9, wherein processing the received aggregated usage data to manage said workload comprises processing the received aggregated usage data to identify bottlenecks and other performance related issues.

13. The method of claim 6, further comprising providing a default aggregation wherein the workload management processing requests data for named processes or threads.

14. A machine comprising a central processing unit, a memory, an operating system that includes a kernel and workload management software, wherein the OS and workload management software both execute on the CPU to:
    start a software application from a startup script on the machine, said startup script including a set of startup tasks;
    receive an application group identifier from said kernel;

associate each of said startup tasks with said application group identifier until said startup script ends;
associate the application group identifier with processes that are forked off during the running of the startup script;
request application group identifiers from said kernel at startup of workload management processing;
determine a correspondence between the application group identifiers returned from said kernel and one or more workloads;
if said application group identifier is equal to a workload, request said kernel to aggregate usage data for said application group identifier;
if said application group identifier is not equal to a workload, determine a set of application group identifiers that comprise a workload, and request said kernel to aggregate usage data for said set of application group identifiers, wherein the workload is identified by a set of application group identifiers when the application group identifier is not equal to a workload;
receive said aggregated usage data from said kernel; and
process the received aggregated usage data to manage said workload.

15. The machine of claim 14, wherein processing the received aggregated usage data to manage said workload comprises processing the received aggregated usage data to determine whether business goals for running mission-critical applications are being met.

16. The machine of claim 14, wherein processing the received aggregated usage data to manage said workload comprises processing the received aggregated usage data to determine whether system resources available are sufficient to meet the business demands.

17. The machine of claim 14, wherein processing the received aggregated usage data to manage said workload comprises processing the received aggregated usage data to identify bottlenecks and other performance related issues.

18. The machine of claim 14, the workload management software further executing on the CPU to provide a default aggregation wherein the workload management processing requests data for named processes or threads.

* * * * *